United States Patent [19]
Ishii et al.

[11] Patent Number: 4,782,999
[45] Date of Patent: Nov. 8, 1988

[54] AIR CONDITIONING APPARATUS AND GRILLE CONTROL METHOD THEREOF

[75] Inventors: Katsushi Ishii; Kazuki Suzuki, both of Fuji, Japan

[73] Assignee: Kabushiki Kaisha Toshiba, Kawasaki, Japan

[21] Appl. No.: 87,794

[22] Filed: Aug. 21, 1987

[51] Int. Cl.⁴ ............................................. F24F 13/14
[52] U.S. Cl. .................................... 236/49; 98/40.12; 98/40.25; 98/40.26
[58] Field of Search .................. 236/49 D, 49 B; 98/40.25, 40.26, 40.27, 40.12, 40.16, 40.17, 107, 110, 121.2

[56] References Cited

U.S. PATENT DOCUMENTS

| | | | |
|---|---|---|---|
| 2,698,570 | 1/1955 | Feinberg | 98/40.27 X |
| 3,063,357 | 11/1962 | Eberhart | 98/110 X |
| 3,122,087 | 2/1964 | Demuth et al. | 98/40.12 |
| 3,381,600 | 5/1968 | Getzin | 98/110 X |
| 3,541,944 | 11/1970 | Kristiansen | 98/40 |
| 3,593,645 | 7/1971 | Day et al. | 98/40.27 |
| 4,303,007 | 12/1981 | Riegel et al. | 98/40.12 |
| 4,537,347 | 8/1985 | Noll et al. | 98/40.25 X |
| 4,541,326 | 9/1985 | Fukuda et al. | 98/40.25 |
| 4,570,533 | 2/1986 | Sugawara et al. | 98/40.12 X |
| 4,677,904 | 7/1987 | Natsumeda et al. | 98/40.26 X |

FOREIGN PATENT DOCUMENTS

| | | |
|---|---|---|
| 56-18107 | 2/1981 | Japan . |
| 57-15295 | 3/1982 | Japan . |
| 1441442 | 6/1976 | United Kingdom . |
| 1481316 | 7/1977 | United Kingdom . |
| 2177500 | 1/1987 | United Kingdom . |

OTHER PUBLICATIONS

British Patent Agent Summary, pp. 1 and 2.

*Primary Examiner*—William E. Tapolcai
*Attorney, Agent, or Firm*—Cushman, Darby & Cushman

[57] ABSTRACT

An air conditioning apparatus includes an air grille having a right side grille, a left side grille and a sub grille disposed between the right side and left side grilles. At the start of the heating operation, the right side and left side grilles and the sub grille are at a downward air flow position at which heating air flows downwardly. A prescribed time after the start of the heting operation, or when the difference between the tempeature of the wall on which the apparatus is installed and a desired room temperature has come into a prescribed range, the right side and left side grilles are rotated to a diagonally-downwardly air flow position at which a portion of the heating air flows diagonally-downwardly while the sub grille is maintained at the downward air flow position.

17 Claims, 10 Drawing Sheets

AIR CONDITIONING APPARATUS AND GRILLE CONTROL METHOD THEREOF

BACKGROUND OF THE INVENTION

1. Field of the Invention

The present invention relates, in general, to air an conditioning apparatus. In particular, the invention relates to an air conditioning apparatus including a rotatable air grille for an exhaust opening for horizontally or downwardly deflecting the air discharged from the exhaust opening. The invention also relates to a method for controlling the rotating position of the air grille of the apparatus with the progress of the heating operation.

2. Description of the Prior Art

Heat-pump type air conditioners are well known, as a heating and cooling apparatus. Generally, the air conditioners of this type are mounted on a wall in the vicinity of the ceiling. In the air conditioners of this type, since the initial temperature of the room in which the air conditioner is installed is low when heating, the specific gravity of the warm air fed from the air conditioner is lower than that of the air in the room. For this reason, the warm air discharged from the air conditioner moves upward, and the temperature rise in the vicinity of the floor takes a great deal of time.

To solve the problem described above, in the conventional air conditioners, the deflection angle of a rotatable air grille is automatically controlled to an optimum position by a motor in accordance with the temperature change in the room or the elapsed time from the starting of operation of the air conditioner.

FIGS. 1 and 2 show one example of the above-described prior art.

A plurality of air intake openings 25 is formed in a front panel 26 of an interior unit 27. An interior heat exchange unit 29 is disposed close to the backside of front panel 26. An air filter 30 is provided on the backside of front panel 26. A drain pan 31 for receiving condensation from heat-exchange unit 29 is provided under heat-exchange unit 29. An exhausting port 83 is provided at the front lower side of interior unit 27. Exhausting port 33 extends over the bottom side of unit 27, as shown in FIG. 1. An air path 35 extending from heat-exchange unit 29 to exhausting port 38 is defined in interior unit 27 by a heat insulation material 37. A fan device 39 and a plurality of rotatable horizontal air flow grilles 41 are provided, in order, from heat-exchange unit 29 toward exhausting port 33 in air path 35. Horizontal air flow grilles 41 are manually operated by a user for controlling the flow of the air discharged from exhausting port 33 in the left and right direction. A rotatable vertical air flow grille 43 is provided on the front side of exhausting port 33. A rotation shaft 45 of vertical air flow grille 43 is connected to a motor (not shown) to automatically rotate vertical air flow grille 43. Therefore, the air discharged from exhausting port 33 is controlled in the vertical direction by vertical air flow grille 43.

The operation of vertical air flow grille 43 of the above-described prior art will be described hereafter. As shown in FIG. 1, vertical air flow grille 43 is perpendicularly disposed in the exhausting port 33 at the start of the heating operation of the apparatus. The air from exhausting port 33 is forcibly exhausted downward to warm the defined space wherein the air conditioning apparatus is installed.

When the heating operation of the apparatus shifts from the above-described initial operation mode to a regular operation mode, vertical air flow grille 43 is automatically rotated by a prescribed angle, as shown in FIG. 2. The air from exhausting port 33 is discharged diagonally-downward, and is spread in the room to warm the entire area of the room.

In this prior art, when the air is discharged diagonally-downward, it may warm the entire room. However, the user may be directly exposed to the diagonally discharged air, causing unpleasant feeling.

SUMMARY OF THE INVENTION

It is an object of the present invention to reduce the direct impingement of the stream of conditioned air on a user or occupant of the space being conditioned.

It is another object of the present invention to sufficiently warm a floor surface in an initial stage of a heating operation.

To accomplish the above objects, the air conditioning apparatus includes an interior unit having an intake port and an exhaust port for drawing intake air from the intake port and exhausting conditioned air from the exhaust port, a temperature detecting circuit for detecting the temperature in the vicinity of the apparatus, and a air guide for channelling the conditioned air from the exhaust port into a defined space being conditioned in a first predetermined direction for conditioning the defined space. The air guide includes a vane device responsive to the detected temperature by the temperature detecting circuit for redirecting only a portion of the conditioned air in a second direction when the temperature in the vicinity of the apparatus is within a prescribed range from a desired temperature. The air guide further includes a sub-vane device oriented for continuously channelling a portion of the conditioned air in the first predetermined direction.

The vane device may include a plurality of rotatable main air grilles. The sub-vane device may include a sub air grille disposed between the main air grilles. The main air grilles are rotated by a grille drive motor. The main air grilles may be positioned in a horizontal air flow position so the conditioned air flow horizontally, in a downward air flow position the conditioned air flows downward or in a diagonally-downward air flow position at which the conditioned air flows diagonally-downward. At the start of the operation, the main air grille is disposed in the downward air flow position. When a temperature difference between the desired room temperature and the temperature in the vicinity of the apparatus has come into a prescribed range within a prescribed time from the start of the operation, the main air grilles are rotated from the downward air flow position to the diagonally-downward air flow position. If the temperature difference does not come into the prescribed range within the prescribed time from the start of the operation, the main air grille rotates from the downward air flow position to the diagonally-downward air flow position the prescribed time after the start of the operation.

The sub air grille is rotated in response to the rotation of the main air grilles. The sub air grille may be disposed in the horizontal air flow position or the downward air flow position. The sub air grille is located at the horizontal air flow position when the main air grilles are disposed in the horizontal air flow position. The sub air grille rotates from the horizontal air flow position to the downward air flow position when the main air grilles rotate from the horizontal air flow position to the downward air flow position. The sub air grille is maintained at the downward air flow position even if the main air grilles rotate from the downward air flow position to the diagonally-downward air flow position during the operation.

BRIEF DESCRIPTION OF THE DRAWINGS

These and other objects and advantages of this invention will become more apparent and more readily appreciated from the following detailed description of the presently preferred embodiment of the invention, read in conjunction with the accompanying drawings wherein.

DETAILED DESCRIPTION OF THE PREFERRED EMBODIMENTS

Figure 1:
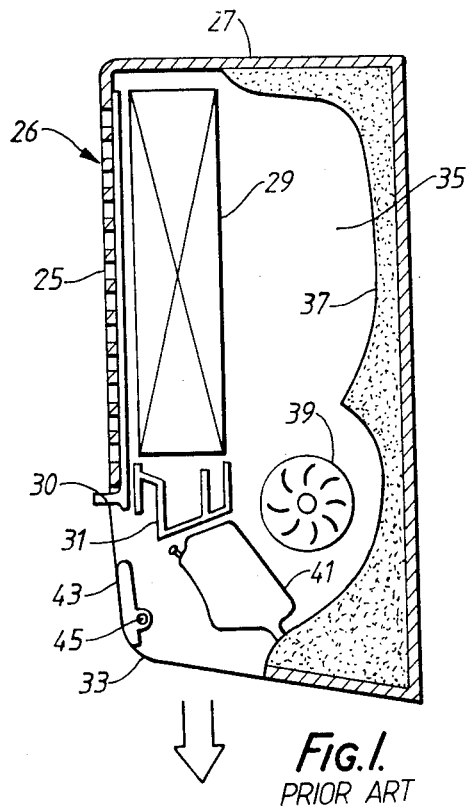
FIG. 1 is a cross-sectional side view of an air conditioning apparatus of the prior art
Figure 2:
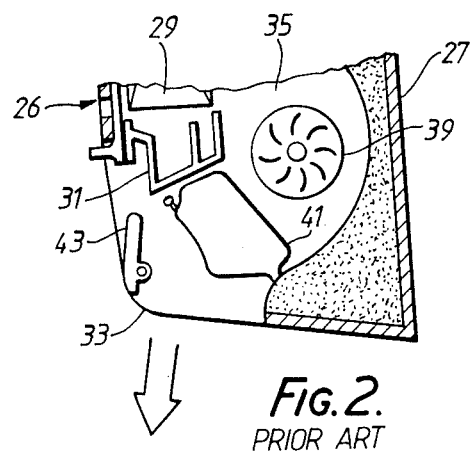
FIG. 2 is a cross-sectional fragmentary side view of the air conditioning apparatus, as shown in FIG. 1.

Referring to the accompanying drawings, one embodiment of the present invention will be described. However, in the drawings, same numerals used above are applied to similar elements, and therefore the detailed descriptions thereof are not repeated.

Figure 3:
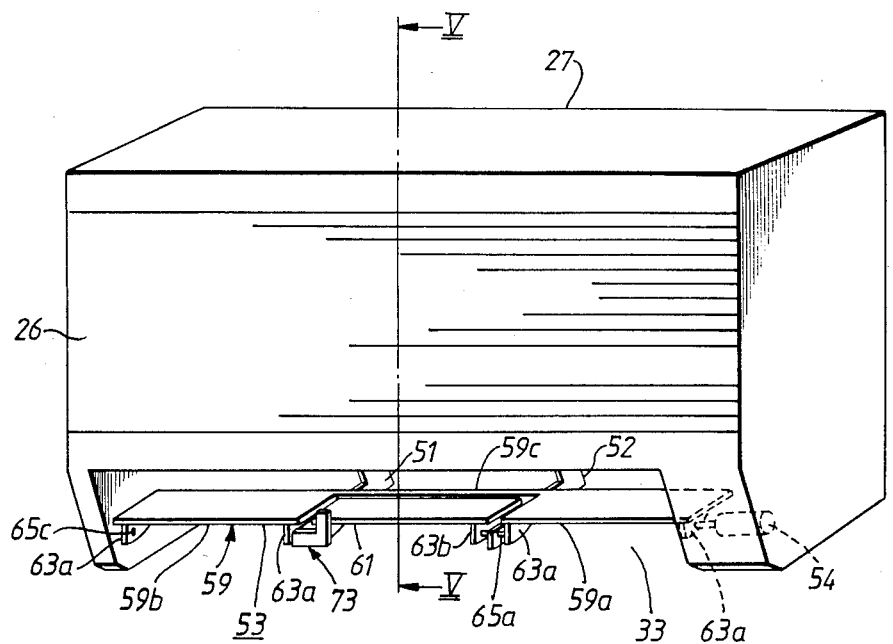
FIG. 3 is a perspective view illustrating an air conditioning apparatus of one embodiment of the present invention.
Figure 4:
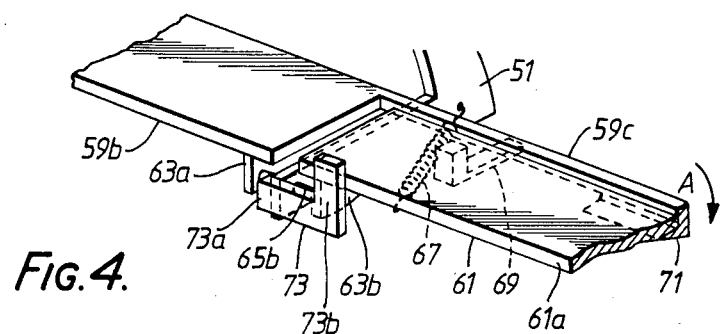
FIG. 4 is a perspective view illustrating an air grille, as shown in FIG. 3.
Figure 5:
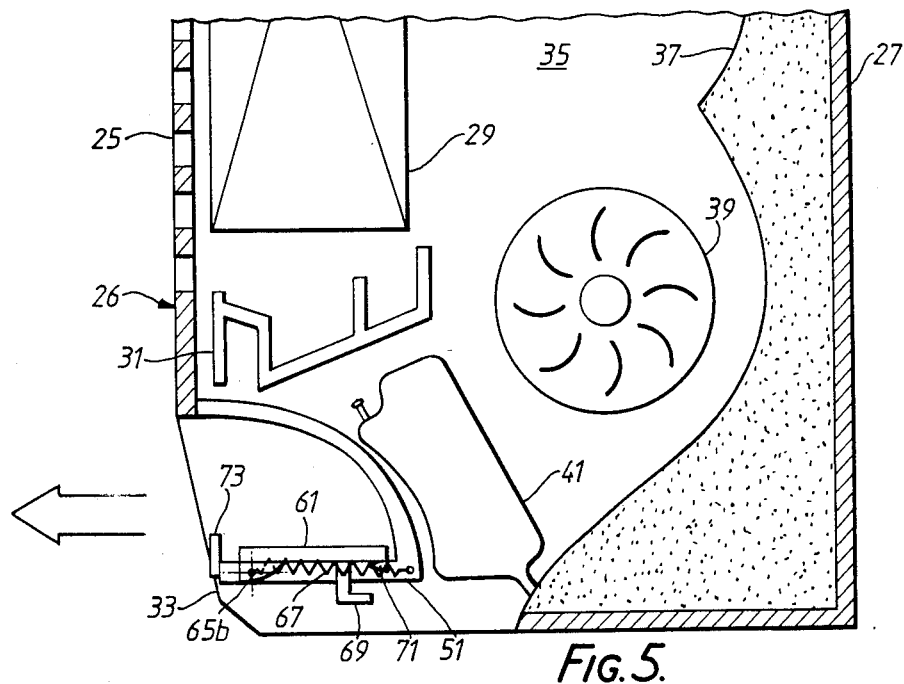
FIG. 5 is an enlarged side view taken on line V—V in FIG. 3.

As shown in FIGS. 3, 4 and 5, a pair of supporting arms 51 and 52 are provided in the vicinity of exhausting port 33. Each of supporting arms 51 and 52 is integrally formed to front panel 26 such that it extends from panel 26 along horizontal air flow grilles 41 and then is bent toward the front side of interior unit 27, as shown in FIG. 5.

A rotatable vertical air flow grille 53 is supported by supporting arms pair 51 and 52 for automatically controlling the flow direction of the air from interior unit 27. Vertical air flow grille 53 is rotated by a grille drive motor 54, described later.

As shown in FIG. 3, vertical air flow grille 53 includes a main grille 59 and a sub grille 61. Main grille 59 includes a right side grille member 59a and a left side grille member 59b. Right side grille member 59a is rotatably supported between the right side wall of unit 27 and supporting arm 52. Left side grille member 59b also is rotatably supported between the left side wall of unit 27 and supporting arm 51. Right side grille member 59a and left side grille member 59b are integrally connected by a connecting bar member 59c. Sub grille 61 also is rotatably supported between supporting arms 51 and 52.

As can be seen in FIGS. 3, 4 and 5, each grille member is provided with a pair of axle support members 63a, one support member 63a projecting downward from each side of the bottom portion of the each grille member. Sub grille 6 also is provided with a pair of axle support member 63b one projecting downward from each side of the bottom portion thereof. One of axle support members 63a of right side grille member 59a adjacent to supporting arm 52 is connected to one of axle support members 63b of sub grille 61 by a pin 65a through supporting arm 52. Also one of axle support members 63a of left side grille member 59b adjacent to supporting arm 51 is connected to the other axle support member 63b of sub grille 61 by a pin 65b, as shown in FIG. 4, through supporting arm 51.

The other axle support member 63a of left side grille member 59b adjacent to the left side wall of interior unit 27 is rotatably supported on the left side wall by a pin 65c. Furthermore, the other axle support member 63a of right side grille member 59a adjacent to the right side wall of interior unit 27 is connected to the rotation shaft of grille drive motor 54. Grille drive motor 54 is provided in interior unit 24, as shown in FIG. 3. As a consequence, main grille 59 is rotated by grille drive motor 54 between a downward air flow position and a horizontal air flow position.

As can be seen in FIG. 4, a tension spring 67 is stretched between the front side of sub grille 61 and supporting arm 52. An L-shaped hook 69 is provided on the rear surface of sub grille 61. L-shaped hook 69 extends to the position facing connecting bar member 59c. A first stopper 71 extends from the center lower portion of connecting bar member 59c to the position opposite to the rear surface of sub grille 61. First stopper 71 prevents sub grille 61 from rotating in the direction indicated by arrow A under the bias of spring 67, and maintains sub grille 61 at the horizontal air flow position, as shown in FIG. 4. Furthermore, first stopper 71 serves as a carrier when main grille 59 rotates counterclockwise from the horizontal air flow position to the downward air flow position. When main grille 59 rotates counterclockwise, first stopper 71 carries sub grille 61 around pins 65a and 65b until the rotation force of spring 67 overcomes its dead center.

A second stopper 73 is provided to the front end portion of support arm 51. A base plate 73a of stopper 73 extends in a right angle from the front end portion of supporting arm 51 toward sub grille 61, as shown in FIG. 4. A stop plate 73b extends upwardly from the top portion of base plate 73a to the position opposite to the front end 61a of sub grille 61. Second stopper 73 retains sub grille 61 at the vertical air flow position against the bias of spring 67 on sub grille 61.

Figure 6:
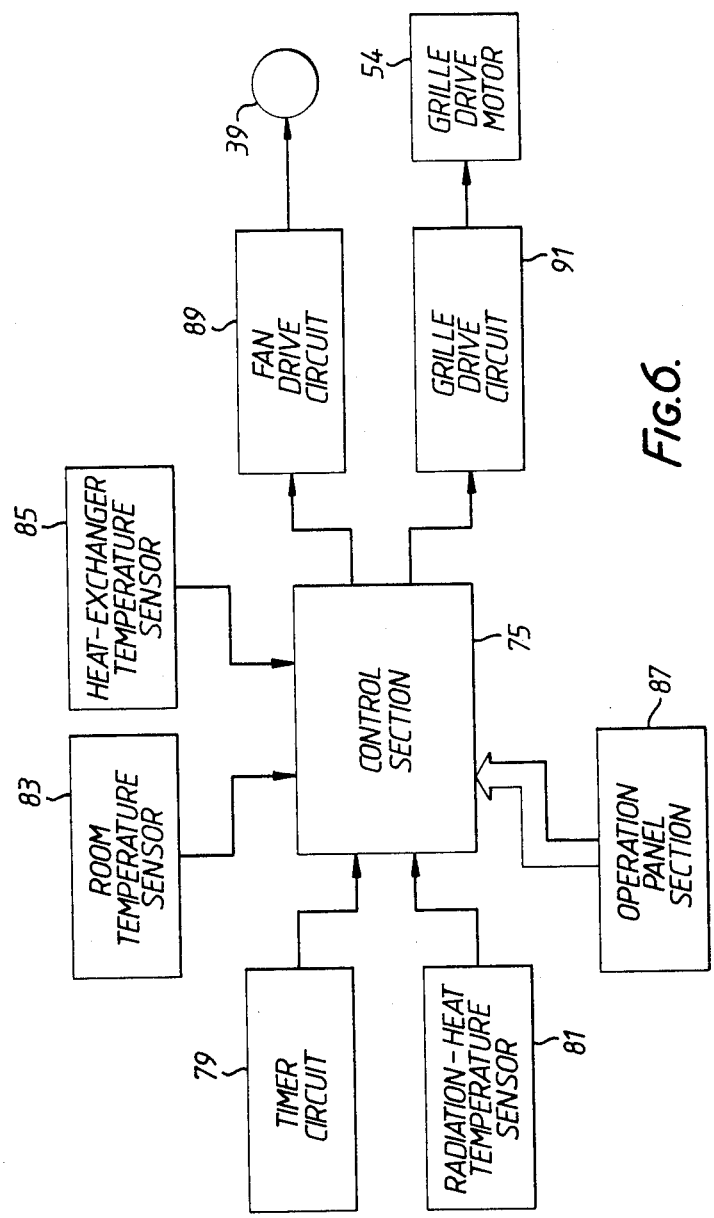
FIG. 6 is a block diagram of a control circuit of the present invention.

FIG. 6 shows a control circuit diagram of this embodiment. A control section 75 includes a microcomputer and its peripheral circuit. A timer circuit 79 generates timing signals from the beginning of the heating/cooling operation and provides the timing signals to control section 75. A radiation-heat temperature sensor 81 detects the temperature of the wall on which interior unit 27 is mounted, and supplies the detection signal to control section 75. A room temperature sensor 83 detects the temperature of the air taken into interior unit 27 through air intake openings 25 of front panel 26. The detection signal from sensor 83 is fed to control section 75. A heat-exchanger temperature sensor 85 detects the temperature of heat-exchange unit 29 provided in interior unit 27, and the detection signal thereof is supplied to control section 75. A user may input desired operation data, such as a desired room temperature, to control section 75 through an operation panel section 87. Control section 75 controls fan device 39 through a fan drive circuit 89 in accordance with the signals from sensors 81, 83 and 85, timer circuit 79 and operation panel section 87. Control section 75 also controls grille drive motor 54 through a grille drive circuit 91 on the basis of the signals of sensors 81, 83 and 85.

The operation of this embodiment in the heating mode will be described by referring to FIG. 7.

First, the heating mode and a desired room temperature Tas are set in control section 75 through operation panel section 87. When an operation signal is supplied to control section 75 through operation panel section 87, control section 75 controls an exterior unit (not shown) including a compressor, a fan device, and a heat-exchange unit. Control section 75 changes a four-way valve (not shown) to establish the heating cycle in the refrigerating circuit (not shown).

Control section 75 detects the temperature Tc of heat-exchange unit 29 (hereinafter referred to as a heat-exchange temperature) through heat-exchanger temperature sensor 85 (step a). In step b, if the heat-exchange temperature Tc is more than a first prescribed value, e.g., 32° C., the NO-path is taken. Otherwise, the YES-path is taken. In step c, if the heat-exchange temperature Tc is less than a second prescribed value, e.g. 40° C., the YES-path is taken. Otherwise, the NO-path is taken. When the YES-path is taken in step c, control section 75 rotates fan device 39, and controls the speed of fan device 39 between a prescribed ultra-low speed ULo and a prescribed medium speed M in response to the heat-exchange temperature Tc (step d). On the other hand, if the NO-path is taken in step c, control section 75 also rotates fan device 39, and controls the speed of fan device 39 on the basis of the difference Diff between the desired room temperature Tas and the actual room temperature Ta detected by room temperature sensor 83 (step e).

Figure 8:
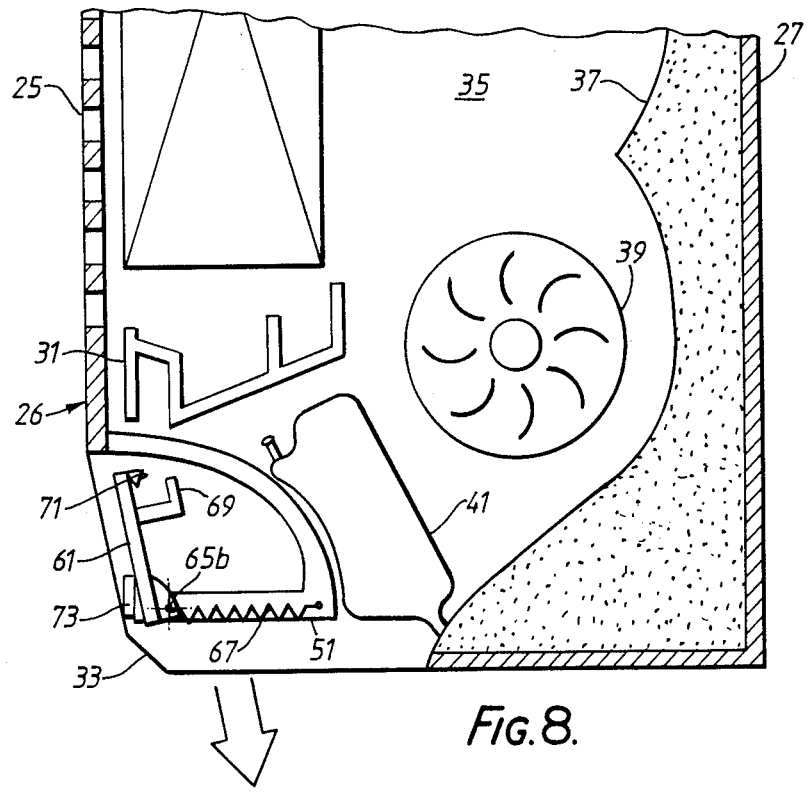
FIG. 8 is an enlarged cross-sectional side view illustrating the air conditioning apparatus, shown in FIG. 5, wherein the air grille is in a downward air flow position.

Immediately after the commencement of the heating operation, the temperature of the wall surface (hereinafter referred to as a wall temperature Tb) on which interior unit 27 is mounted is detected by control section 75 through radiation-heat temperature sensor 81. The elapsed time t from the commencement of the heating operation is counted by timer circuit 29. If the wall temperature Tb is not within prescribed range α, e.g., 5° C., from the desired room temperature Tas (the upper-limit temperature), the NO-path is taken (step f). Otherwise the YES-path is taken. In step g, if the elapsed time t from the starting of the heating operation has not reached a prescribed time t1, the NO-path is taken. Control section 75 supplies a downward air flow command (D command) to grille drive circuit 91 (the step h). When grille drive circuit 91 receives the downward air flow command, air grille 53 is rotated by grille drive motor 54 until air grille 53 reaches the downward air flow position (step k), as shown in FIG. 8.

The downward air flow operation of air grille 53 will be described. At the initial stage main grille 59 is rotated counterclockwise by grille drive motor 54. At the same time, first stopper 71 on connecting bar member 59c lifts sub grille 61 from its horizontal position against the biasing force of spring 67. During the rotation of main grille 59, the connecting point between spring 67 and the front end 61a of sub grille 61 gradually moves counterclockwise.

Figure 9:
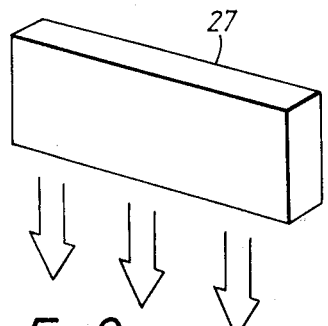
FIG. 9 is a schematic perspective view illustrating the air flow from the apparatus shown in FIG. 8.
Figure 10:
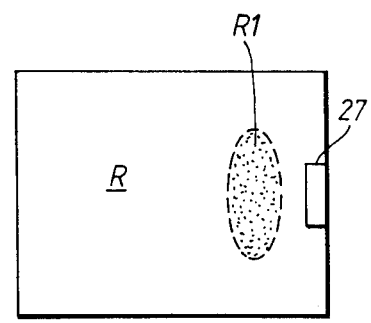
FIG. 10 is a plan view illustrating the portion of a room warmed by the air conditioning apparatus shown in FIG. 9.

Finally, the connecting point between spring 67 and the front end 61a of sub grille 61 overcomes its dead center on a line extending through the pin 65b and the connecting point between spring 67 and supporting arm 51. Therefore, sub grille 61 is forcibly rotated by the biasing force of spring 67 until sub grille 61 is in contact with stop plate 73b of second stopper 73. After that, sub grille 61 stops at the downward air flow position, as shown in FIG. 8. In this position, the air discharged from exhausting port 33 flows downward through air grille 53, as shown in FIGS. 8 and 9. Therefore, the floor portion R1 of the room R in the vicinity of interior unit 27 is intensively warmed by the downward warm air flow, as shown in FIG. 10.

Figure 7:
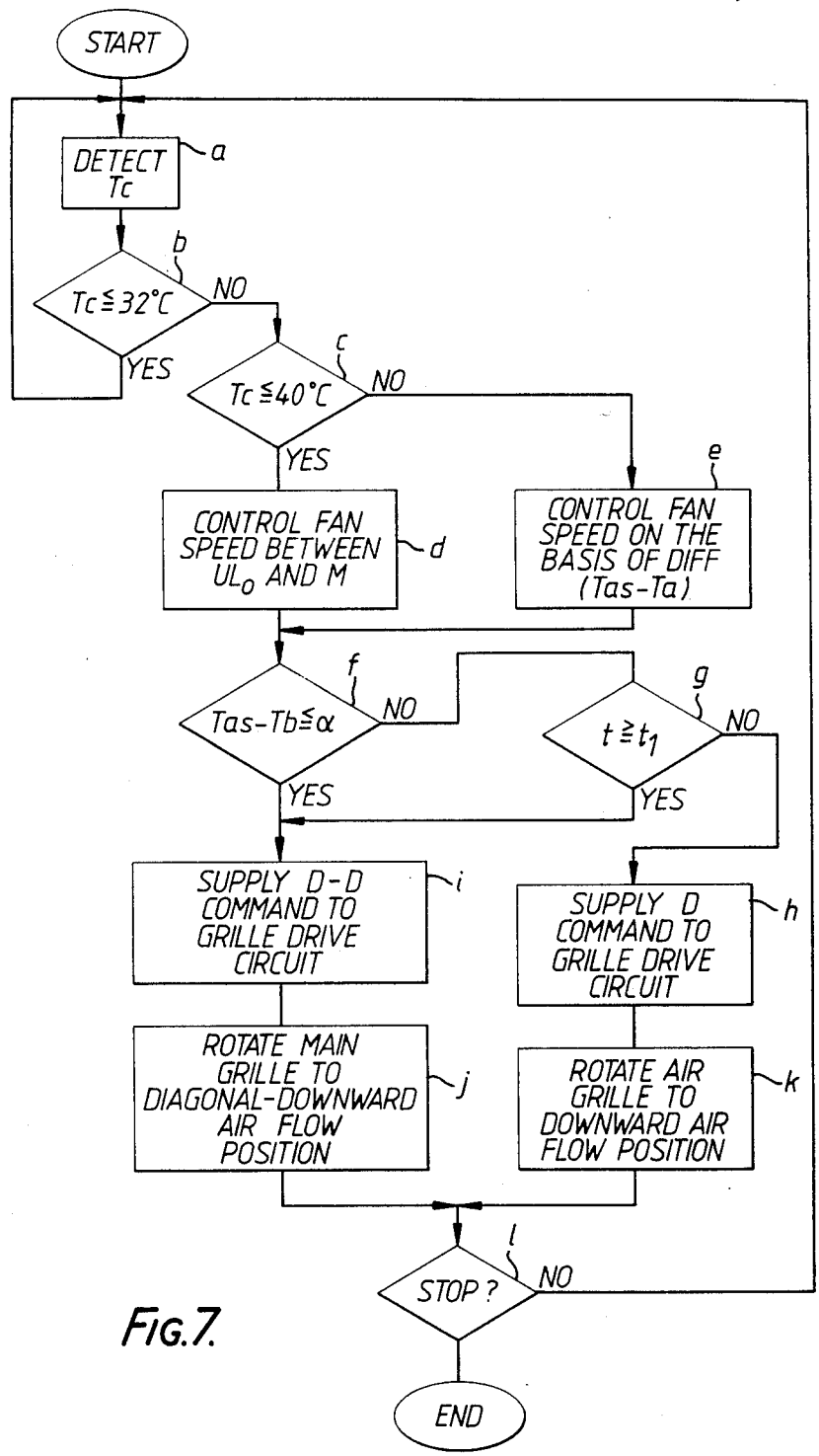
FIG. 7 is a flow chart of the operation of the control circuit shown in FIG. 6.
Figure 11:
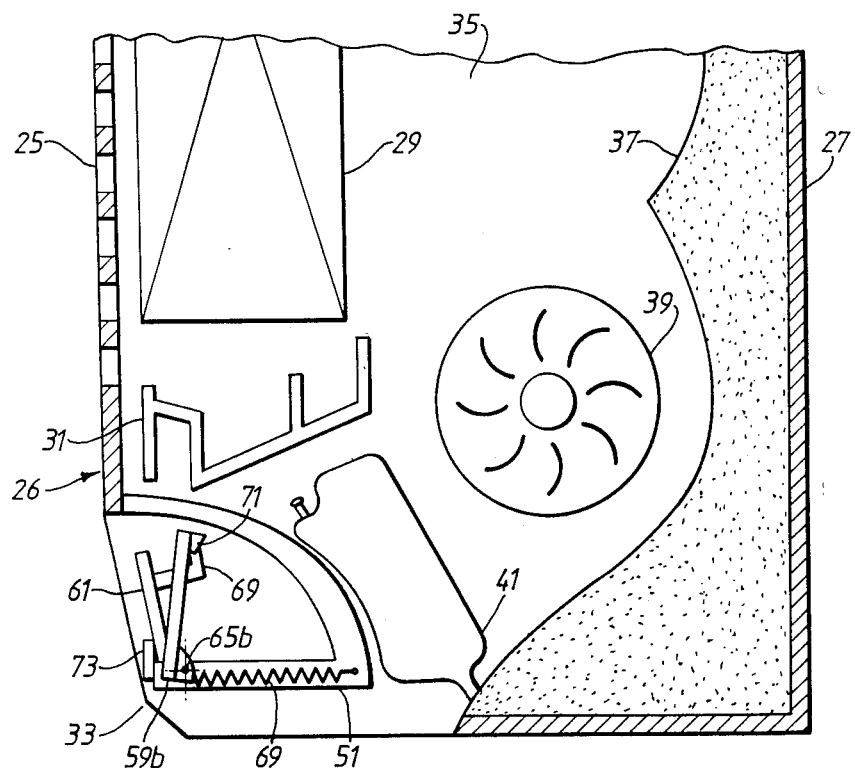
FIG. 11 is an enlarged cross-sectional side view illustrating the air conditioning apparatus, shown in FIG. 5, wherein a main air grille is in a diagonal-downward air flow position.

In step f of FIG. 7, when the YES-path is taken because of the increase of wall temperature Tb, control section 75 supplies a diagonal-downward air flow command to grille drive circuit 91 (step i). When grille drive circuit 91 receives the diagonal-downward air flow command (D-D command), main grille 59 is rotated by grille drive motor 54 until main grille 59 reaches the diagonal-downward air flow position (step j), as shown in FIG. 11.

Figure 12:
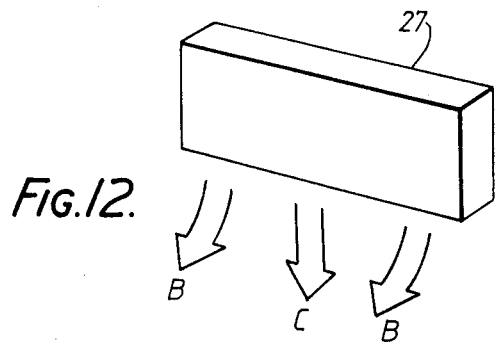
FIG. 12 is schematic perspective view illustrating the air flow from the apparatus shown in FIG. 11.
Figure 13:
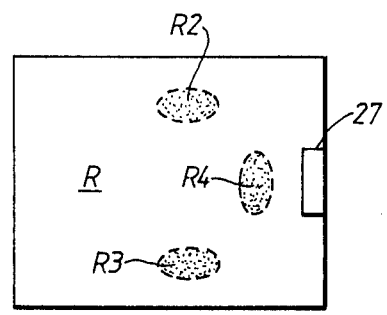
FIG. 13 is a plan view illustrating the portions of the room warmed by the air conditioning apparatus shown in FIG. 12.

The diagonal-downward air flow operation of air grille 53 will be described. Main grille 59 is rotated clockwise from the downward air flow position shown in FIG. 8 by a prescribed angle. On the other hand, since sub grille 61 is urged by the biasing force of spring 67, sub grille 61 is maintained at the downward air flow position. As a consequence, the air guided by right side grille member 59a and left side grille member 59b is discharged diagonally-downward (arrow B in FIG 12) from exhausting port 33. Furthermore, the air guided by sub grille 61 is discharged downward (arrow C in FIG. 12) from exhausting port 33. As can be seen in FIG. 13, the air streams discharged from exhausting port 33 indicated by arrow B reach both side floor portions R2 and R3 of room R. On the other hand, the air stream discharged from exhausting port 33 indicated by arrow C reaches the middle floor portion R4 in the vicinity of the wall on which interior unit 27 is mounted.

As can be understood from the above description, the air discharged from interior unit 27 may effectively warm the whole room R. Air discharged from interior unit 27 does not directly strike a user when the user sits on the floor in the center portion of room R.

In steps f and g, if the difference between wall temperature Tb and the desired room temperature Tas is not within the prescribed range when the prescribed time t1 has elapsed, the YES-path is taken. This is because the rise in wall temperature Tb is delayed, if the heat insulation of the room R is insufficient. In step i, control section 75 supplies the diagonal-downward air flow command to grille drive circuit 91. The following operation of air grille 53 through grille drive circuit 91 is the same operation as described above. In step 1, if a stop command is supplied to control section 75, the YES-path is taken, and the air conditioner stops. Otherwise, the NO-path is taken, and the above-described operation is re-executed.

The rotating operation of air grille 53 from the downward air flow position or the diagonal-downward air flow position to the horizontal air flow position will be described. Main grille 59 is rotated clockwise by grille drive motor 54. When main grille 59 rotates, connecting bar member 59c of main grille 59 comes in contact with L-shaped hook 69 of sub grille 61. Sub grille 61 is forcibly rotated clockwise by the cooperation of connecting bar member 59c and hook 69 against the biasing force of spring 67, as main grille 59 rotates. When spring 67 overcomes its dead center, the biasing force thereof serves as the force which forcibly rotates sub grille 61 clockwise. Sub grille 61 finally stops at its horizontal air flow position when sub grille 61 is in contact with first stopper 71 of connecting bar member 59c, as shown in FIGS. 3 and 4.

With this embodiment described above, since the downward air flow is carried out at the beginning of the heating operation, the floor portion of the room in the vicinity of the wall on which the air conditioner is mounted is sufficiently warmed. Furthermore, since diagonal-downward air flow operation is automatically carried out following the downward air flow operation, the whole room is rapidly warmed. In the regular operation, warm air from the exhausting port is discharged into the room in two different directions, the heating distribution in the room being heated is greatly improved, as compared with the prior art.

A second embodiment of the present invention will be described with reference to FIGS. 14, 15 and 16.

Figure 14:
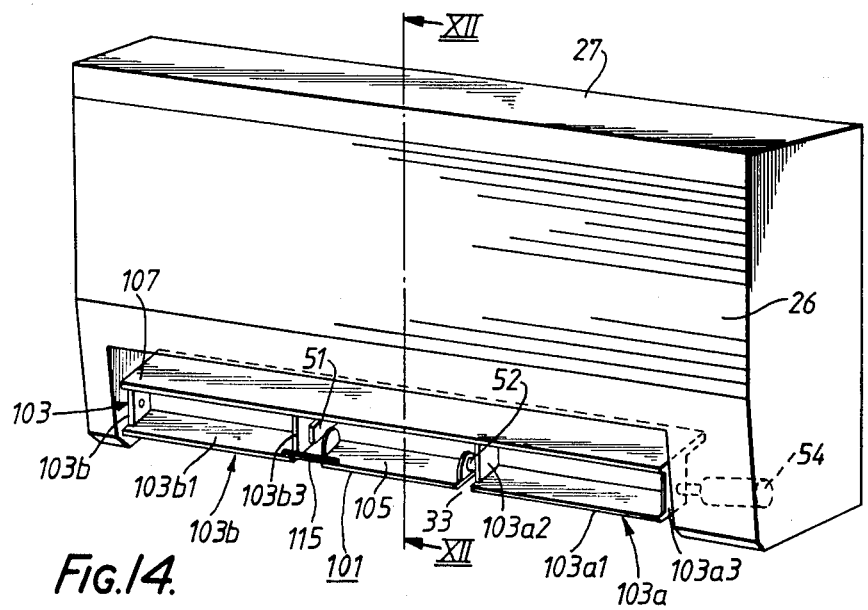
FIG. 14 is a perspective view illustrating an air conditioning apparatus of second embodiment of the present invention.

As can be seen in FIG. 14, a double air grille 101 is rotatably supported by supporting arms 51 and 52. Double air grille 101 includes a main grille 103 and a sub grille 105. Main grille 103 includes an elongated base plate 107, a right side grille 103a and a left side grille 103b. Right side grille 103a and left side grille 103b are individually disposed on opposite side portions of elongated base plate 107.

Right side grille 103a includes a base plate 103a1 and a pair of arms 103a2 and 103a3 extending upward from the both ends of base plate 103a1 to base plate 107. Projection ends of arms 103a2 and 103a3 are connected to base plate 107. The construction of left side grille 103b is the same as that of right side grille 103, described above. Sub grille 105 is disposed between right side grille 103a and left side grille 103b, and is rotatably supported by supporting arms 51 and 52. The air from fan device 39 flows between base plate 107 and sub grille 105.

Figure 15:
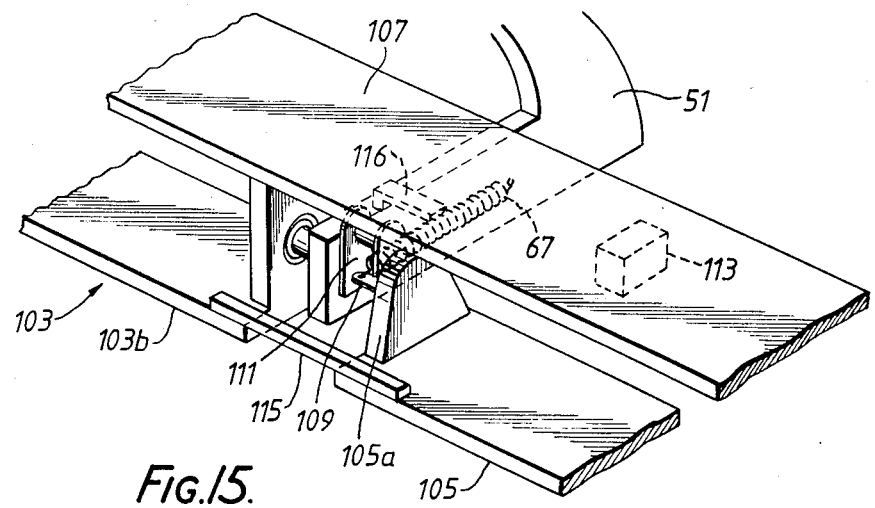
FIG. 15 is a perspective view illustrating an air grille, as shown in FIG. 14.
Figure 16:
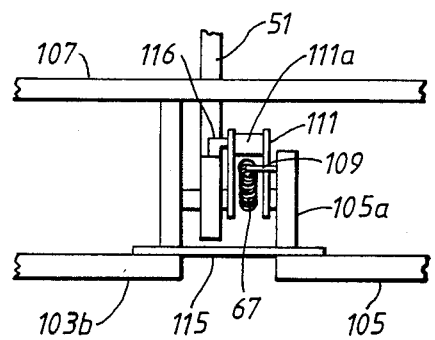
FIG. 16 is a front view of the air grille shown in FIG. 15.

As can be seen in FIGS. 15 and 16, a tension spring 67 is stretched between a receiving member 109 projecting from the front upper portion of a side wall 105a of sub grille 105 and supporting arm 51. Side Wall 105a of sub grille 105 is rotatably connected to supporting arm 51 through a crank-shaped shaft member 111. A shaft portion 111a of shaft member 111 is disposed above spring 67, as shown in FIG. 16. Shaft member 111 is fixed to side wall 105a of sub grille 105.

Figure 17:
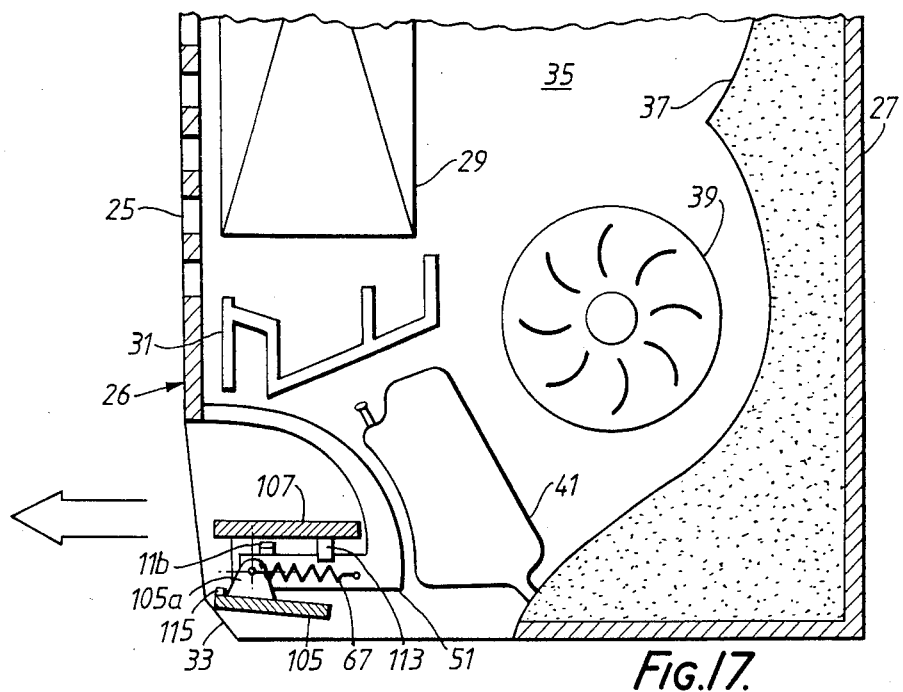
FIG. 17 is an enlarged side view taken on line XII—XII in FIG. 14.

As shown in FIG. 15, a protrusion member 113 is provided on the rear surface portion of base plate 107 opposite to sub grille 105. One end of a bar-shaped first stopper 115 is fixed to the front upper surface of left-hand grille 103b. The other end of first stopper 115 is in contact with the front upper surface of sub grille 105. First stopper 115 prevents sub grille 105 from clockwise rotation. Sub grille 105 is maintained at the horizontal air flow position against the biasing force of spring 67, as shown in FIG. 17. On the other hand, when main grille 103 is rotated counterclockwise by grille drive motor 54, first stopper 115 forcibly rotates sub grille 105 against the biasing force of spring 67 until spring 67 overcomes its dead center.

Figure 18:
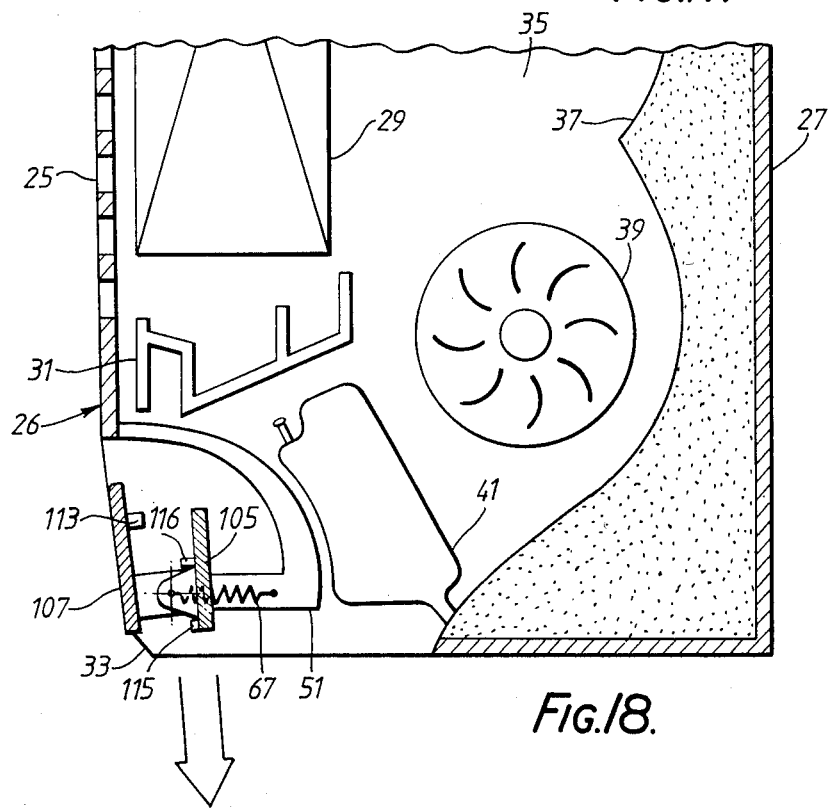
FIG. 18 is an enlarged cross-sectional side view illustrating the air conditioning apparatus, shown in FIG. 17, wherein the air grille is in a downward air flow position.

An L-shaped second stopper 116 is provided on the upper edge of supporting arm 51 adjacent to shaft member 111. Second stopper 116 extends parallel with shaft member 111. As shown in FIG 18, second stopper 116 maintains sub grille 105 at the downward air flow position against the biasing force of spring 67.

The operation of the above described second embodiment will be described by referring to FIGS. 17, 18 and 19. Interior unit 27 of the second embodiment also is provided with a control circuitry, as shown in FIG. 6. The operation of the control circuitry of the second embodiment is the same as that of the one embodiment described above. Thus, only the rotating operation of air grille 101 will be described hereafter. In the initial stage of the heating mode, air grille 101 rotates from the horizontal air flow position shown in FIG. 17 to the downward air flow position shown in FIG. 18. Main grille 103 is rotated counterclockwise by grille drive motor 54. At the same time, first stopper 115 contacting sub grille 105 forcibly rotates sub grille 105 counterclockwise from the horizontal air flow position against the biasing force of spring 67. Receiving member 109 of sub grille 105 also is rotated counterclockwise. When spring 67, stretched between receiving member 109 and supporting arm 51, Overcomes its dead center, sub grille 105 is forcibly rotated by the biasing force of spring 67 until sub grille 105 is in contact with second stopper 16, as shown in FIG. 18. Main grille 103 finally stops at the downward air flow position, as shown in FIG. 18. In this position, the air discharged from exhausting port 33 flows downward along main grille 103 and sub grille 105. Therefore, as described above, the floor portion in the vicinity of interior unit 27 is warmed by the downward flowed air.

Figure 19:
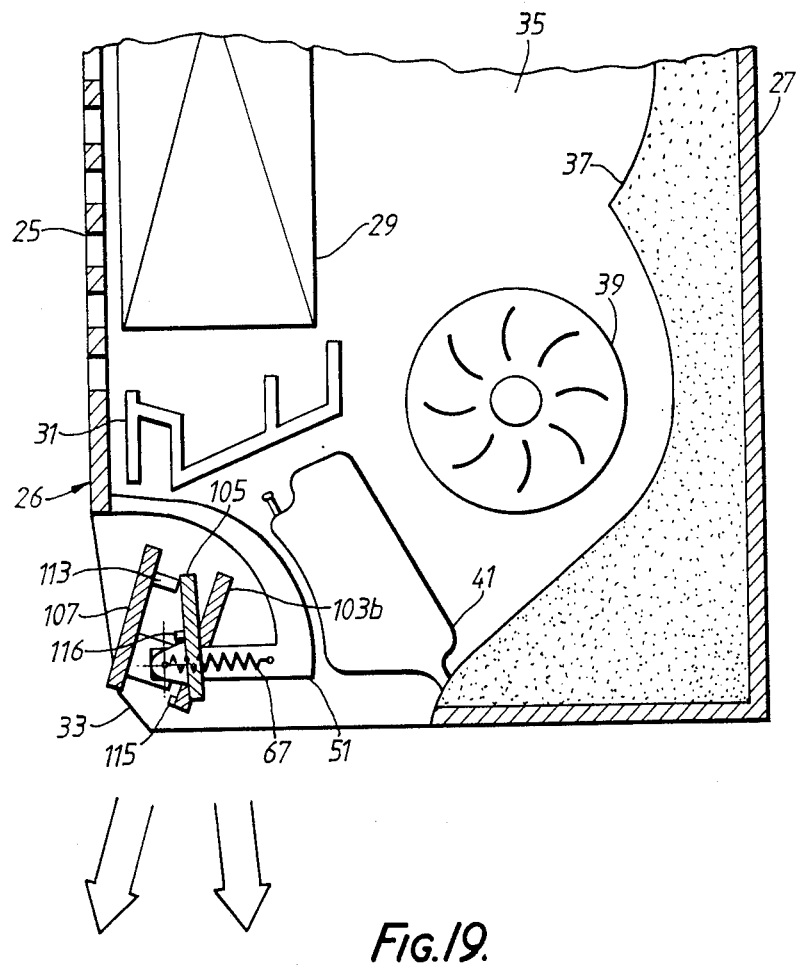
FIG. 19 is an enlarged cross-sectional side view illustrating the air conditioning apparatus shown in FIG. 17, wherein a main air grille is in a diagonal-downward air flow position.

When the prescribed conditions, such as e.g., wall temperature Tb, the elapsed time t, etc., are satisfied, main grille 103 is rotated clockwise by a prescribed angle, as shown in FIG. 19. At this time, since sub grille 105 is urged counterclockwise by spring 67, sub grille 105 is maintained at the downward air flow position. Therefore, the air guided by right side grille 103a and left side grille 103b is discharged diagonally-downward (arrow B in FIG. 19) from exhausting port 33. The air guided by sub grille 105 is discharged downward (arrow C in FIG. 19) from exhausting port 33.

The rotating operation of air grille 101 from the downward air flow position or the diagonally-downward air flow position to the horizontal air flow position will be described.

When main grille 103 is rotated clockwise by grille drive motor 54, protrusion member 113 comes into contact with sub grille 105. Sub grille 105 is rotated clockwise against the biasing force of spring 67 as main grille 103 rotates. When spring 67 overcomes its dead center, the biasing force thereof serves as the force which forcibly rotates sub grille 105 clockwise. As a result, sub grille 105 finally stops at the horizontal air flow position shown in FIG. 17 when sub grille 105 is in contact with first stopper 115.

With this embodiment, the whole room is efficiently warmed, similar to the first embodiment. Furthermore, in this embodiment, since the discharged air flow path is defined by base plate 107, right and left hand grilles 103a and 103b and sub grille 105, the discharged air is guided well by those grilles.

In the above-described embodiments, the air grille is divided into three grille members. However, it may be divided into more than three members. The number of members depends on the width of the exhausting port of the interior unit. If the air grille is divided into more than three members, a plurality of the sub grilles may be provided. In this case, the direction of the discharged air guided by each sub grille may differ from one another to spread the air in the whole room. The present invention is disclosed only with respect to a heating mode. However, the present invention also may be applied to a cooling mode.

The present invention has been described with respect to specific embodiments. However, other embodiments based on the principles of the present invention should be obvious to those of ordinary skill in the art. Such embodiments are intended to be covered by the claims.

What is claimed is:

1. An air conditioning apparatus for heating or cooling a defined space, comprising:
   interior unit conditioning means having an intake port and an exhaust port for drawing intake air from the intake port and exhausting conditioned air from the exhaust port;
   detecting means for outputting a detecting signal representative of the temperature in the vicinity of the apparatus;
   means for determining whether the temperature in the vicinity of the apparatus is inside of a prescribed range from a desired temperature on the basis of the detecting signal from the detecting means; and
   guide means for channelling the conditioned air from the exhaust port into the defined space in a first predetermined direction for conditioning the defined space, said guide means including vane means responsive to the determining means for redirecting only a portion of the conditioned air in a second direction when the temperature in the vicinity of the apparatus is inside of said prescribed range.

2. An apparatus according to claim 1, wherein the guide means includes a sub-vane means oriented for continuously channelling a portion of the conditioned air in the first predetermined direction.

3. An air conditioning apparatus, comprising:
   interior unit conditioning means having an intake port and an exhaust port for drawing intake air from the intake port, and exhausting one of heated and cooled air from the exhaust port;
   means for detecting the temperature in the vicinity of the apparatus;
   guide means responsive to said detecting means for channelling the air from the exhaust port into a space being heated or cooled, including a main air grille rotatable between first, second and third positions, each position for channelling one of heated and cooled air in one of three different directions respectively, and a sub air grille rotatable between the first and third positions for channelling one of heated and cooled air in the first or third direction.

4. An apparatus according to claim 3, wherein the interior unit conditioning means includes an external cover having the intake port and exhaust port arranged therein, and support means for rotatably supporting the main air grille and sub air grille in the exhaust port.

5. An apparatus according to claim 4, wherein the support means includes a pair of support arms, the main and sub air grilles being pivoted on the support arms, the main and sub air grilles being pivoted on the support arms.

6. An apparatus according to claim 5, wherein the guide means also includes drive means for rotating the main air grille, and biasing means for rotating the sub air grille in response to the rotation of the main air grille.

7. An apparatus according to claim 6, wherein the biasing means includes a spring between the sub air grille and one of the support arms for biasing the sub air grille in the first position when the main air grille is situated in the first position, and biasing the sub air grille in the third position when the main air grille is situated in the second or third position.

8. An apparatus according to claim 7, wherein the biasing means includes a first stopper on the main air grille interacting with the sub air grille for rotating the sub air grille when the main air grille is rotated from the first position to the third position.

9. An apparatus according to claim 8, wherein the biasing means also includes a second stopper on one of the support arms for maintaining the sub air grille in the third position against the bias of the spring.

10. An apparatus according to claim 9, wherein the sub air grille includes hook means interacting with the main air grille for rotating the sub air grille.

11. An apparatus according to claim 3, wherein the interior unit conditioning means includes heat-exchange means for exchanging heat with the air from the air intake port.

12. An apparatus according to claim 11, wherein the interior unit conditioning means further includes fan means for forcibly flowing intake air from the air intake port to the air exhausting port through the heat-exchange means.

13. An apparatus according to claim 6, wherein the main air grille includes a plurality of grille members, the sub air grille being disposed between the grille members.

14. An apparatus according to claim 13, wherein the main air grille includes an elongated plate, each grille member being fixed to the elongated plate for defining an air flow path by the elongated plate and each grille member.

15. An apparatus according to claim 14, wherein the sub air grille includes intermediate shaft means for rotatably supporting the sub air grille to the support means.

16. An apparatus according to claim 15, wherein the elongated plate includes protrusion means for rotating the sub air grille in response to the rotation of the main air grille from the third position to the first position.

17. A method for operating the air grille of an air conditioning apparatus including a main grille and a sub grille, comprising the steps of:
 measuring the time from the start of the operation of the apparatus;
 rotating the main grille and the sub grille to a downward air flow position for directing air in a downward direction;
 detecting the temperature in the vicinity of the apparatus;
 rotating only the main grille from the downward air flow position to a diagonally-downward air flow position for redirecting a portion of the air from the apparatus in a diagonally-downward direction when either a detected temperature within a prescribed range of a desired temperature or a prescribed elapsed time from the start of operation of the apparatus passes.

* * * * *